March 11, 1969   H. ALBINGER, JR., ET AL   3,432,697
ADJUSTABLE TORSION MEMBER MECHANISM FOR TORSION MEMBER CLOCKS
Filed Jan. 21, 1966

Inventor:
Harry Albinger Jr.
Chester B. Marble
by Zenard J Platt
Attorney.

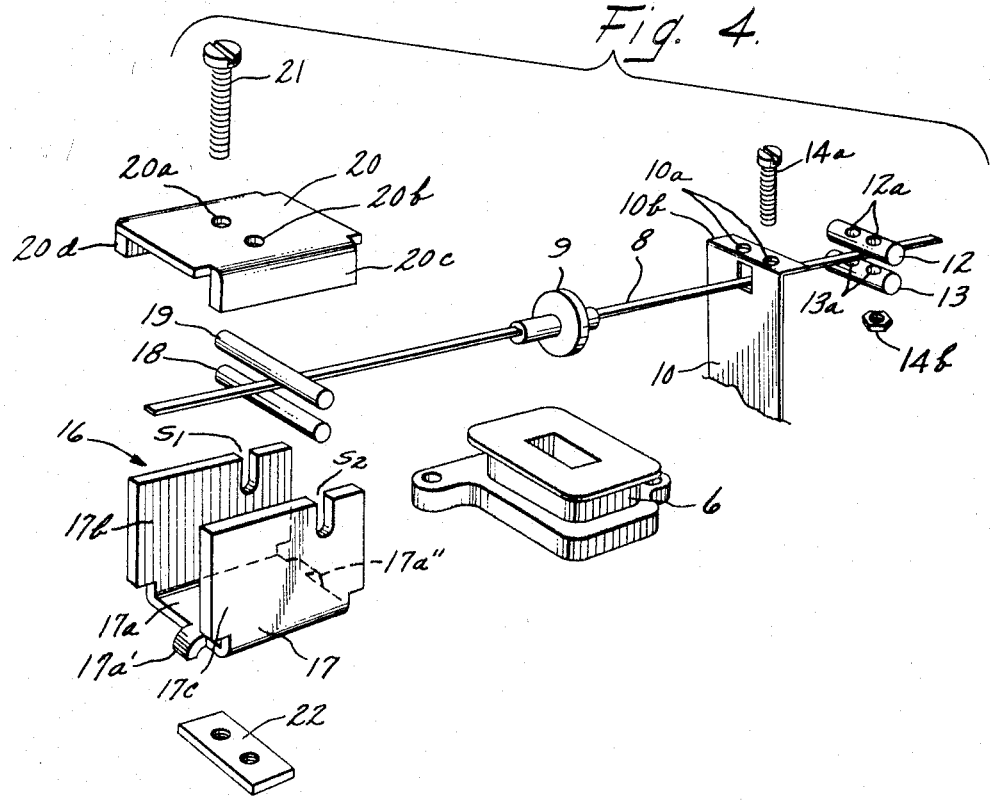

United States Patent Office 3,432,697
Patented Mar. 11, 1969

3,432,697
ADJUSTABLE TORSION MEMBER MECHANISM FOR TORSION MEMBER CLOCKS
Harry Albinger, Jr., and Chester B. Marble, Ashland, Mass., assignors to General Electric Company, a corporation of New York
Filed Jan. 21, 1966, Ser. No. 522,274
U.S. Cl. 310—36       11 Claims
Int. Cl. H02k 33/02

ABSTRACT OF THE DISCLOSURE

A mechanism for adjusting the torsion member of a torsion member clock wherein a first adjusting mechanism is provided for adjusting the effective length of the torsion member and a second adjusting mechanism is provided for adjusting the tension on the torsion member.

---

This invention relates to torsion member clocks and, more particularly, to a mechanism for adjusting the torsion member oscillation frequency in a torsion member clock.

A torsion member clock is generally comprised of a battery-powered pulse or A.C. permanent magnet motor which drives the clock hands at a rate of rotation which is synchronized with and controlled by electrical signals supplied from oscillations of an electromagnetic-mechanical oscillator. The electromagnetic-mechanical oscillator generally includes a permanently magnetized member secured to a torsion member in the form of a wire. The magnetized member is positioned within a magnetic field which is established by a coil, and the coil is electrically connected to a regenerative active feedback circuit which causes the magnetized member and the torsion member to oscillate. The oscillating magnetized member, in turn, induces a signal in the coil which is fed to the motor control circuit to control the motor rate of rotation. Adjustments in the motor rate of rotation are achieved by altering the mechanical oscillation frequency of the torsion member.

It is an object of this invention to provide improved means for altering the oscillation frequency of the torsion member.

Another object is to provide means for obtaining a coarse frequency adjustment by varying the length of torsion member.

A further object is to provide means for obtaining a fine frequency adjustment by varying the axial tension on the torsion member.

Another object is to provide non-slip terminations for a torsion member that will not be affected by shock and vibration.

A further object is to provide terminations for a torsion member that will clamp the member in such a manner as to minimize the compressive stresses that may contribute to early fatigue failure of the torsion member.

Another object is to reduce the end effect of the terminations to a minimum so that the torsional system will closely approximate the theoretical amplitude-frequency characteristic for an oscillating torsional system.

A further object is to facilitate easy repair or replacement and adjustment so that ordinary clock repairmen can make repairs economically.

In accordance with this invention, in one form thereof, a first support is secured to the frame of a torsion member clock. Friction engagement means is positioned on the first support for engaging a torsion member in the form of a wire. The first support is adjustable for changing the length of the wire to provide a coarse frequency adjustment. Friction engagement means are provided thereon for permanently securing the wire against gradual release. The other end of the torsion wire is attached to a second support which is adjustable for altering the tension in the wire to provide a fine adjustment of oscillation frequency of the torsion member.

For a more detailed description of this invention, references made to the following specification and the accompanying drawings of which:

FIGURE 4 is an exploded view in perspective showing the coil and torsion member with the supporting apparatus.

Figure 1:
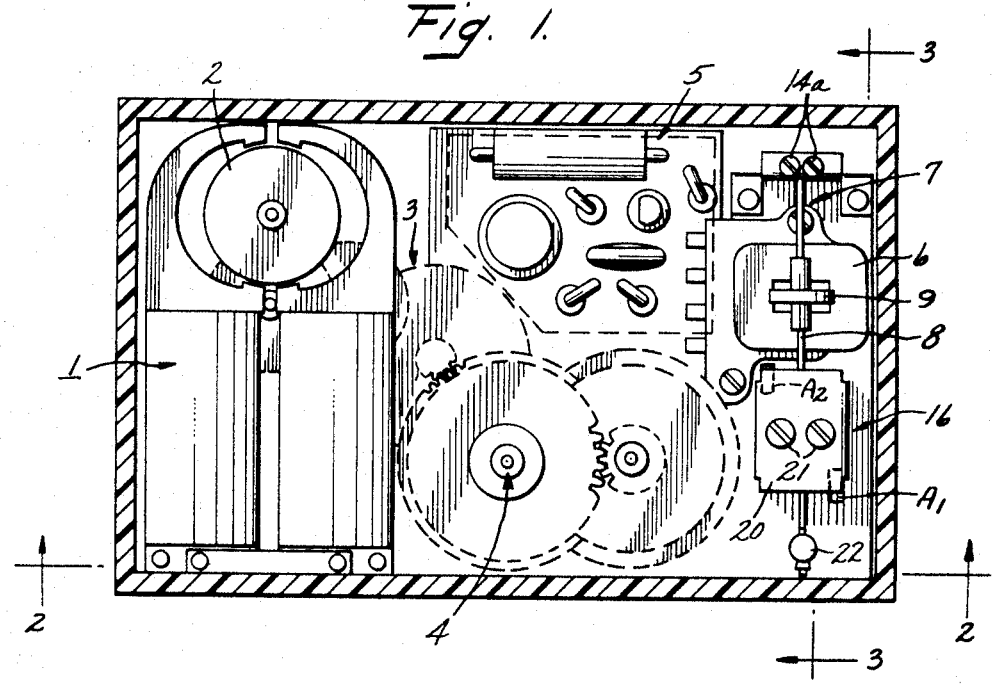
FIGURE 1 is an elevation view section showing the general components of a torsion member clock.
Figure 2:
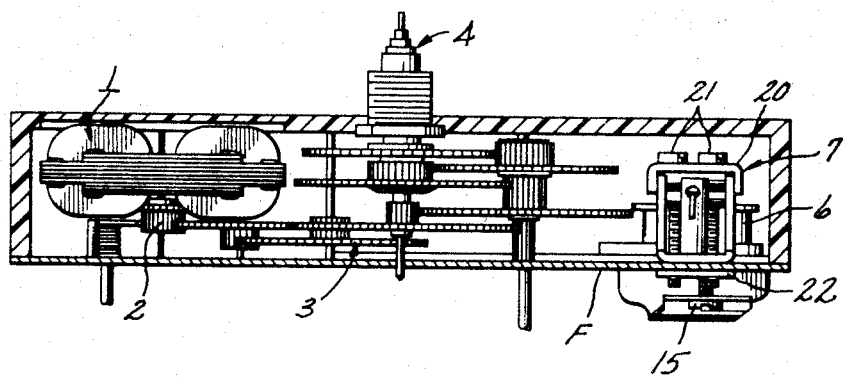
FIGURE 2 is a sectional plan view along the line 2—2 of FIGURE 1.

Referring to FIGURES 1 and 2, the torsion member clock mechanism is depicted and includes a pulse or A.C. permanent magnet motor 1 having a rotor 2 which is coupled in driving engagement with a gear train 3 for driving a pair of clock hands (not shown) by means of the concentric shaft mechanism 4. The rotor 2 is powered by electrical signals from an electrical oscillator circuit 5. A coil 6 is electrically connected to the electrical oscillator circuit 5 and is positioned adjacent to an electromagnetic-mechanical torsion member mechanism 7.

Figure 3:
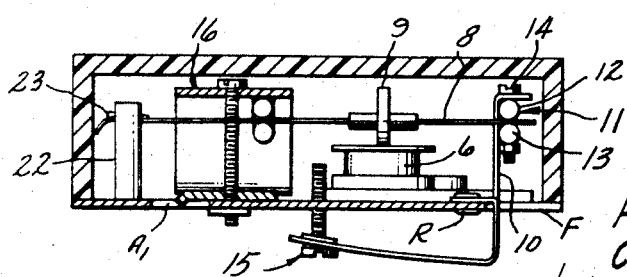
FIGURE 3 is a sectional view along the line 3—3 of FIGURE 1, showing the coil and torsion member with its supporting apparatus.

The torsion member mechanism 7 is more clearly indicated in FIGURES 3 and 4. Specifically, the mechanism includes a torsion member illustrated in the form of the flat wire 8 of rectangular cross-section but which may have any convenient cross-section so long as it exhibits acceptable torsion characteristics for producing uniform torsional oscillations. A permanent magnet 9 is fixedly secured to the torsion wire 8 and is positioned adjacent the coil 6 so as to be affected by a magnetic field induced by the coil 6. A first end of the torsion wire 8 is secured to a first support 10 by friction engaging means 11. One form of friction engaging means is shown as comprising a pair of pins 12 and 13 having apertures 12a and 13a, respectively, diametrically disposed therethrough. The torsion wire 8 is maintained in friction engagement between the pins 12 and 13 by pin bolts 14a which project through apertures 10a through a flange portion 10b on the first support 10. The pin bolts 14a also pass through the pin apertures 12a and 13a and are threaded into pin nuts 14b. Compression is established between the pins 12 and 13 and the torsion wire 8 by tightening the pin bolts 14a to thereby frictionally engage one end of the torsion wire 8 in the first support 10.

The expected operational lifetime of the clock is a minimum of 10 years, so non-releasable engagement between the wire and its support is necessary to maintain clock accuracy. To this end, a flat rectangular wire held between cylindrical pins is employed to provide a secure, long-life form of engagement.

To prevent excessive stresses and end effects on the torsional system, the pins 12 and 13 are relatively soft compared to the torsion wire 8. The pins deform quite readily about the wire to provide an area contact instead of a line contact, greatly reducing the stresses in the torsion wire. Further, the plastic flow of pin material about the wire tends to improve the uniformity of the clamp across the wire and prevents one side of the wire from being tight and the other side loose. Any looseness of the clamp across its width will result in fretting and poor amplitude-frequency characteristics.

The first support 10 is secured to the clock frame or mounting member F by rivets R or similar engaging means. The first support 10 is pivoted about the rivets R by an adjustable screw 15 which rotatably engages an opposite end of the support 10, and threadedly engages the mounting member F. Rotation of the screw 15 forces the first support 10 to move relative to the mounting member F by flexure in the region of the rivets R.

The opposite end of the torsion wire 8 is secured and tensioned by a second support 16. The second support 16 is comprised of a substantially U-shaped rigid support member 17 which includes a base portion 17a and two upstanding leg portions 17b and 17c. A pair of ears 17a' and 17a'' are formed integrally with the base portion 17a and project downwardly into slots $A_1$ and $A_2$ in the mounting member F to prevent rotation of the U-shaped support member relative to the frame F while still permitting relative longitudinal or axial sliding movement between the support member and the mounting member.

A pair of slots $S_1$ and $S_2$ are disposed in the top edge of the upstanding leg portions 17b and 17c of the U-shaped support member 17. A pair of rods 18 and 19 are cradled in the slots $S_1$ and $S_2$, the top portion of the top rod 19 projecting slightly above the top surface of the upstanding portions 17b and 17c when one end of the torsion wire 8 is inserted between the rods. A cover plate 20 is positioned over the top of the upstanding portions and in engagement with the upwardly projecting portion of the top rod 19. The cover plate 20 has a pair of apertures 20a and 20b therethrough for receiving a pair of plate bolts 21 which project downwardly through the cover plate 20, through holes in the base portion 17a, through slots in the mounting member F, and are threaded into a double nut 22. Downwardly directed flange portions 20c and 20d cover the slots $S_1$ and $S_2$ and thereby maintain the rods 18 and 19 therein.

Tightening of the plate bolts 21 forces the cover plate 20 downwardly and against the top rod 19 which is, in turn, forced downwardly toward the bottom rod 18. When the torsion wire 8 is positioned between the rods 18 and 19, the force exerted by the rods 18 and 19, when the plate bolts 21 are tightened, operates to secure the wire relative to the second support 16. The pins 12 and 13 and the rods 18 and 19 are of cylindrical cross-section and the wire 8 is of rectangular cross-section.

As in the case of the pins 12 and 13 discussed previously, the rods 18 and 19 are relatively soft compared to the wire 8. The rods, therefore, deform quite readily about the wire 8 to provide an area contact instead of a line contact, greatly reducing the stress in the torsion wire 8. Further, as in the case of pins 12 and 13, the plastic flow rod material about the wire tends to improve the uniformity of the clamp across the wire and prevents one side of the wire from being tight and the other side loose. Any looseness of the clamp across its width will result in fretting and poor amplitude-frequency characteristics.

The firm gripping of the wire in the manner described between the pins 12 and 13 at one termination of the wire and the rods 18 and 19 at the other termination of the wire provide a secure engagement of the wire throughout the life of the clock, resisting any shock or vibration. Further, the manner of gripping at the terminations minimizes stresses in the torsion wire at the area of engagement, thereby achieving long life of the torsion wire under the oscillating conditions involved.

The second support 16 may be slid relative to the mounting member F along the slots $A_1$, $A_2$ to enable length adjusting of one end of the torsion wire 8. Since the slots $S_1$ and $S_2$ are located near one end of the second support, a longer wire 8 may be accommodated by reversing the orientation of the second support on the mounting member F.

Use of the adjusting mechanism facilitates tension adjustment of the wire 8 in the following manner. One end of the torsion wire is initially inserted between pins 12 and 13 on the first support 10, allowing the proper length of free torsion wire between magnet 9 and pins 12 and 13. Pin bolts 14 are tightened to grip this end of the torsion wire between the pins 12 and 13. Then the other end of the torsion wire is pinned to a stud 22 by a pin 23 so that the magnet 9 is visibly centered in the slot in coil 6. Longitudinal force is applied to the wire 8 to deflect the support member 10 and establish the main tension on wire during the pinning operation. The second support 16 is then placed on the mounting member F. This support includes the rods 18 and 19 which are assembled on opposite sides of the wire 8. The support is then slid along the slots $A_1$ and $A_2$ until the proper length of wire is obtained to make the torsion member mechanism oscillate at substantially the desired frequency. The plate bolts 21 are tightened to force the plate and the top rod 19 downwardly so that the torsion wire is compressed between rods 18 and 19, thereby maintaining the established length and tension. This positioning of the second support 16 provides the coarse adjustment of frequency. Fine adjustment of the tension in the wire 8 is accomplished by adjusting the screw 15 which pivots the first support 10 about rivets R. This provides fine adjustment of the frequency.

By employing the length and tension adjustment arrangements as disclosed in this specification, both coarse and fine frequency adjustment of the torsion wire may be accomplished to facilitate synchronization of the torsional oscillation frequency of the torsion wire with the desired frequency to thereby provide increased accuracy of the clock.

Although a specific embodiment of this invention has been shown and described, it is not intended that the invention be limited to the particular structure and it is intended by the appended claims to cover all modifications within the spirit and scope of this invention.

What is claimed as new and desired to be secured by Letters Patent of the United States is:

1. In a torsion member clock having an electric motor, an adjustable electromagnetic-mechanical oscillator for controlling the speed of the electric motor comprising:
    (a) a torsion member, said torsion member having a magnet mounted thereon for torsional oscillation within a magentic field,
    (b) a first support for securing a first end of said torsion member,
    (c) a second support for securing a second end of said torsion member,
    (d) means for adjusting said first support to vary the tension of said torsion member for adjusting the frequency of said torsion member, and
    (e) a mounting member having a slot therein, said second support being slidably mounted on said mounting member and including an ear extending into said slot for permitting longitudinal movement but preventing rotational movement of said second support relative to said mounting member.

2. In a torsion member clock having an electric motor, an adjustable electromagnetic-mechanical oscillator for controlling the speed of the electric motor comprising:
    (a) a torsion member, said torsion member having a magnet mounted thereon for torsional oscillation within a magnetic field,
    (b) a first support for securing a first end of said torsion member,
    (c) a second support for securing a second end of said torsion member,
    (d) means for adjusting said first support to vary the tension of said torsion member for adjusting the frequency of said torsion member, and
    (e) a mounting member having a slot therein, said second support being comprised of a substantially U-shaped member having a base portion and a pair of upstanding leg portions, said base portion having an ear extending into said slot for preventing rotational movement of said second support relative to said mounting member.

3. An adjustable electromagnetic-mechanical oscillator as recited in claim 2 wherein said upstanding leg portions have slots in the ends thereof, wherein said second support includes first and second rods, said rods are supported within said slots in said upstanding leg portions with a portion of said first rod extending above the ends of said upstanding leg portions, and wherein said first end of said torsion member extends between said rods, and further including a cover plate in engagement with the ends of said upstanding leg portions and in engagement with said first rod, and means for urging said cover plate against said first rod to frictionally secure said torsion member between said rods.

4. An adjustable electromagnetic-mechanical oscillator as recited in claim 3 wherein said first and second rods are of cylindrical shape and said torsion member is comprised of a substantially flat wire of rectangular cross-section.

5. An adjustable electromagnetic-mechanical oscillator as recited in claim 3 wherein said first and second rods are of softer material than said torsion member whereby said rods deform readily about said torsion member to provide an area contact thereby minimizing stresses in said torsion member.

6. In a torsion member clock having an electric motor, an adjustable electromagnetic-mechanical oscillator for controlling the speed of the electric motor comprising:
 (a) a torsion member, said torsion member having a magnet mounted thereon for torsional oscillation within a magnetic field,
 (b) a first support for securing a first end of said torsion member,
 (c) a second support for securing a second end of said torsion member,
 (d) means for adjusting said first support to vary the tension of said torsion member for adjusting the frequency of said torsion member, and
 (e) a mounting member and means on said first support for engaging said mounting member to move said first support relative to said mounting member for adjusting the tension on said torsion member.

7. An adjustable electromagnetic-mechanical oscillator as recited in claim 6 wherein said means for securing a first end of said torsion member includes first and second pins and wherein said pins are formed of a softer material than said torsion member, whereby said pins deform readily about said torsion member to provide an area contact thereby minimizing stresses in said torsion member.

8. An adjustable electromagnetic-mechanical oscillator as recited in claim 6 wherein said means for securing a first end of said torsion member comprises first and second pins, said pins having diametrically disposed apertures therethrough, said torsion member extending between said pins, and means extending through said apertures for urging said pins together to frictionally engage said torsion member between said pins and to secure said torsion member to said first support.

9. An adjustable electromagnetic-mechanical oscillator as recited in claim 6 wherein said means for moving said first support relative to said mounting member comprises a screw, and said screw rotatably engages said first support and threadedly engages said mounting member whereby rotation of said screw moves said first support relative to said mounting member.

10. In a torsion member clock having an electric motor, an adjustable electromagnetic-mechanical oscillator for controlling the speed of the electric motor comprising:
 (a) a torsion member, said torsion member having a magnet mounted thereon for torsional oscillation within a magnetic field,
 (b) a first support for securing a first end of said torsion member,
 (c) a second support for securing a second end of said torsion member,
 (d) means for adjusting said second support to vary the effective length of said torsion member for adjusting the frequency of said torsion member, and
 (e) means for adjusting said first support to vary the tension of said torsion member for adjusting the frequency of said torsion member.

11. An adjustable electromagnetic-mechanical oscillator as recited in claim 10 wherein said means for adjusting said second support provides a coarse adjustment of frequency and said means for adjusting said first support provides a fine adjustment of frequency.

References Cited

UNITED STATES PATENTS 2,815,477  12/1957  Dunn et al. _____ 331—154 XR
3,008,070  11/1961  Nemeth _____ 335—271

MILTON O. HIRSHFIELD, *Primary Examiner.*

D. F. DUGGAN, *Assistant Examiner.*

U.S. Cl. X.R.

58—23; 318—341; 331—154; 335—274